United States Patent
Suzuki et al.

(10) Patent No.: US 6,931,162 B1
(45) Date of Patent: Aug. 16, 2005

(54) IMAGE PROCESSING APPARATUS

(75) Inventors: Hiroyuki Suzuki, Toyokawa (JP);
Hideaki Mizuno, Toyokawa (JP);
Hideyuki Toriyama, Toyokawa (JP);
Nobuo Kamei, Toyokawa (JP);
Tsuyoshi Yoneyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 737 days.

(21) Appl. No.: 09/714,553

(22) Filed: Nov. 17, 2000

(30) Foreign Application Priority Data

Nov. 18, 1999 (JP) ................................. 11-328130

(51) Int. Cl.[7] ............................................. G06K 9/36
(52) U.S. Cl. .................................................. 382/286
(58) Field of Search ............................... 382/260–266, 382/275, 286, 298, 310, 307; 358/1.6, 1.2; 348/332

(56) References Cited

U.S. PATENT DOCUMENTS

| 5,553,167 A | * | 9/1996 | Dowling ...................... 382/270 |
| 5,867,634 A | | 2/1999 | Hirota et al. ................. 358/1.2 |
| 5,868,666 A | | 2/1999 | Okada et al. ................. 600/118 |

FOREIGN PATENT DOCUMENTS

| JP | 10-271080 | 10/1998 | |
| JP | 11-112753 | 4/1999 | |
| JP | 11-164139 | 6/1999 | |
| JP | 11-317887 | * 11/1999 | ............ H04N 5/14 |

* cited by examiner

Primary Examiner—Bhavesh M. Mehta
Assistant Examiner—Duy M. Dang
(74) Attorney, Agent, or Firm—Burns, Doane, Swecker & Mathis, LLP

(57) ABSTRACT

In an image processing circuit, an area determination section comprises a device having a rewritable circuit configuration such as a field programmable gate array (FPGA). Consequently, the circuit configuration of the area determination section is rewritten, so that the image processing algorithm is changed. Specifically, in the area determination section, a filtering circuit and line memories (for example, FIFO memories) for forming a pixel matrix are formed by using the FPGA, and the configuration of the line memories (the lateral size and the number of lines) and the configuration of the filtering circuit are changed in accordance with a set image processing condition such as the output size or the mode.

16 Claims, 10 Drawing Sheets

Sub Scanning Direction

100L

- Isolated Point
- Filter

85L

- Isolated Point
- Filter

100L

85L

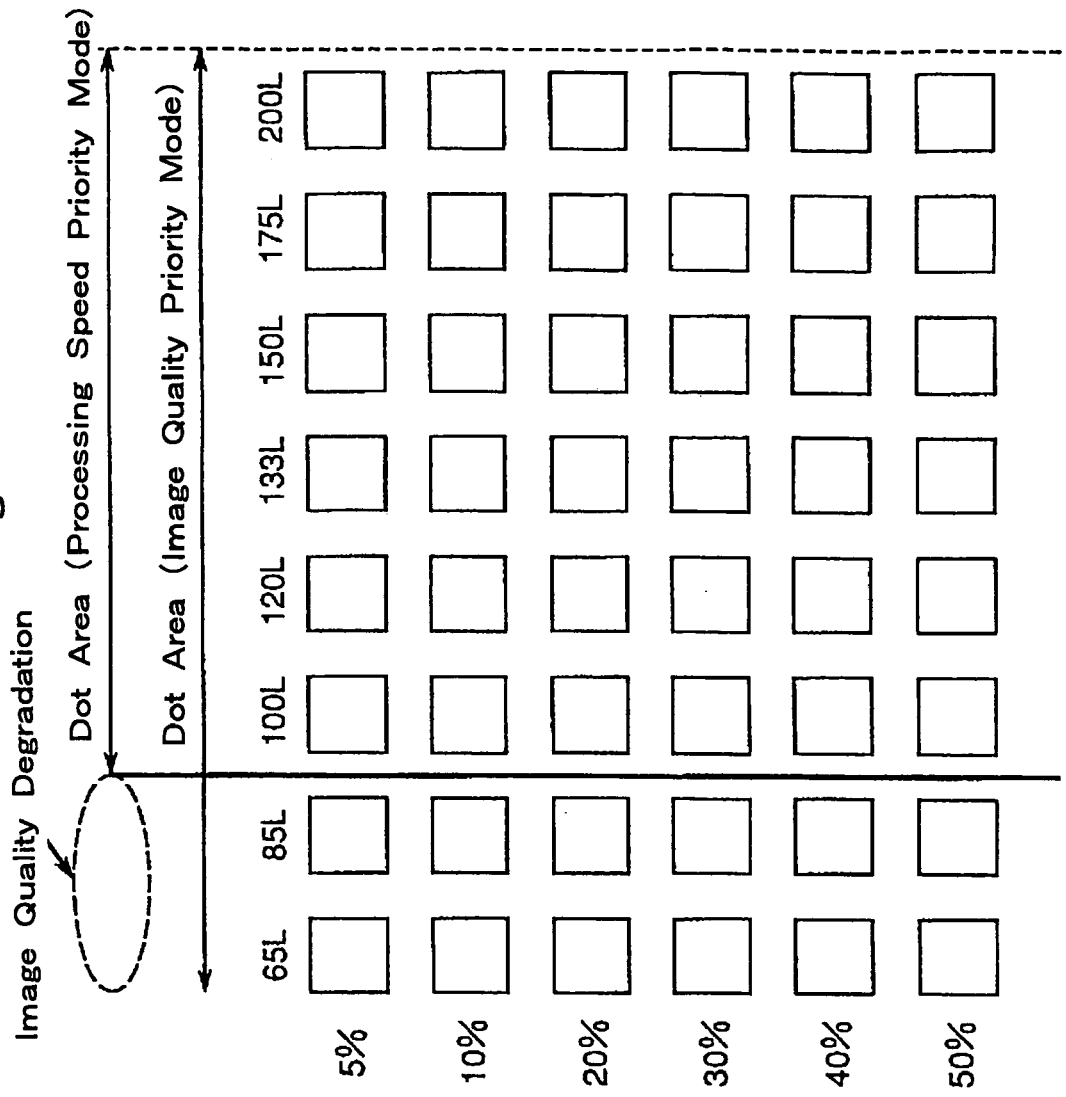

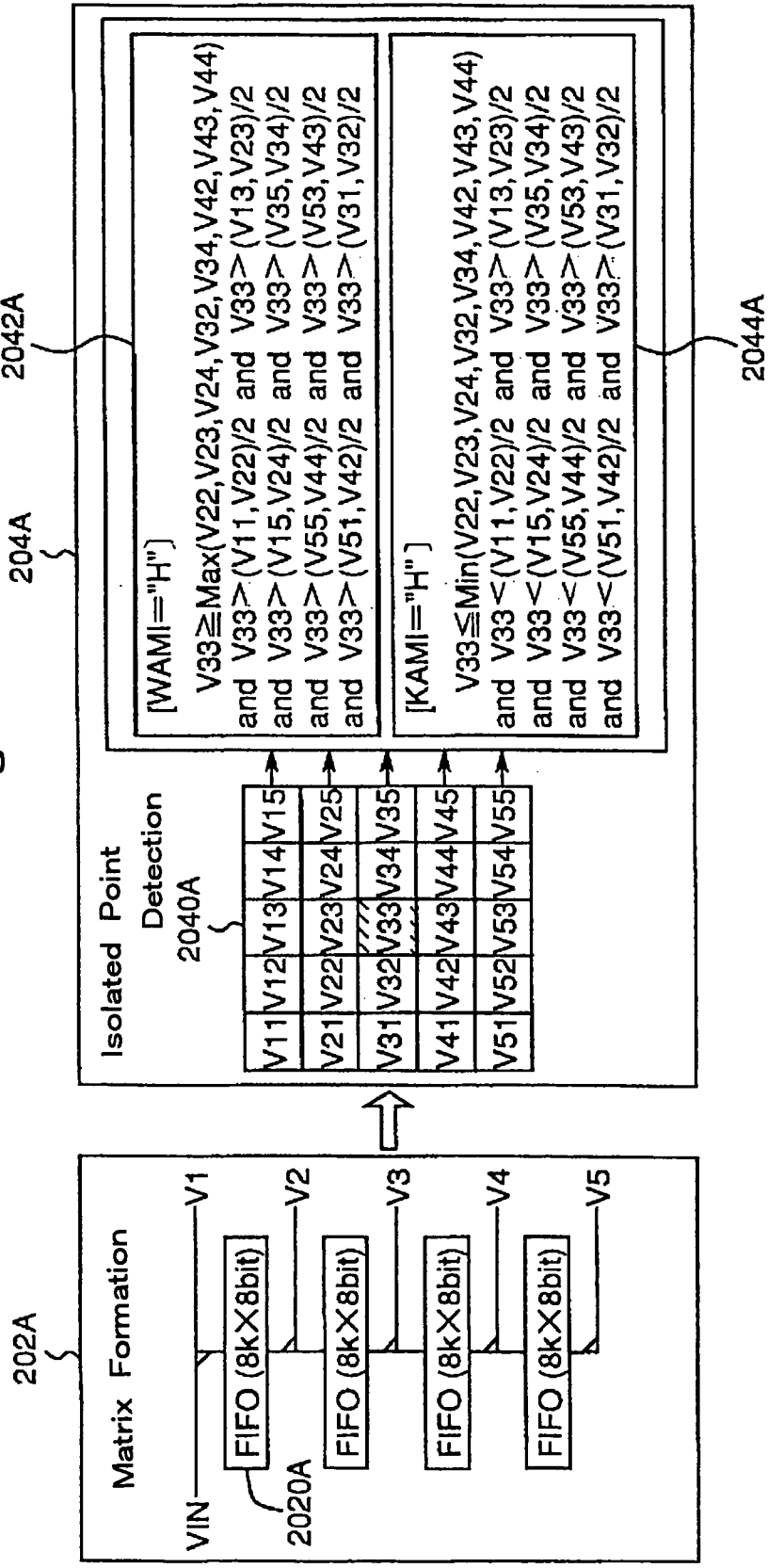

Fig. 10
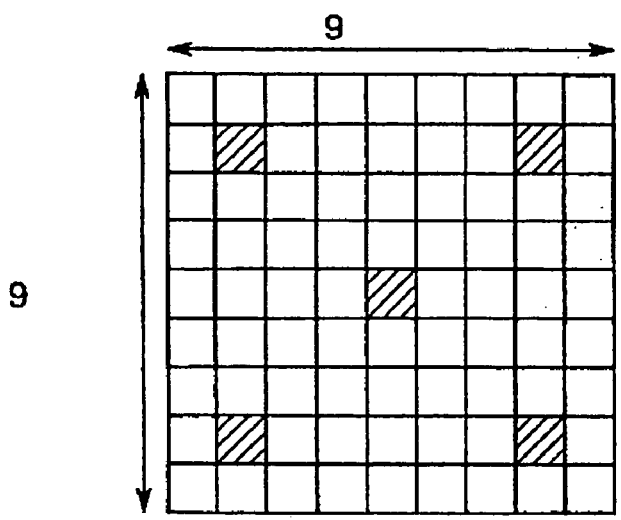
Number of Isolated Points = 5
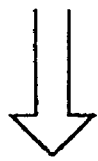
Number of Isolated Points in 9 * 41 Matrix
= 5 * 41 / 9 = 22
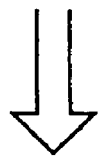
Threshold Value for Image Quality Priority Mode → 22

IMAGE PROCESSING APPARATUS

CROSS-REFERENCE TO RELATED APPLICATIONS

This application is based on application No. 11-328130 filed in Japan, the contents of which are hereby incorporated by reference.

BACKGROUND OF THE INVENTION

1. Field of the Invention

The present invention relates to an image processing apparatus for processing image data, and more particularly, to an image processing apparatus using a rewritable device.

2. Description of the Related Art

A real-time image processing apparatus optimally processes image data read by a one-dimensional image sensor of a reader in real time, and sends the processed image data to an outputter. Here, a plurality of line memories (for example, FIFO memories) are used in an image processing circuit mainly using a spatial filter. The size, the number and the configuration of the line memories are univocally decided by a predetermined image processing condition, for example, the image quality, the output image size or the reading rate depending on the reading resolution of the image sensor, or the processing speed required in accordance with the printer system speed. The circuit configuration associated with the line memories and the image processing algorithm are similarly univocally decided. Therefore, when the user changes the image processing condition such as the image quality, the output image size or the processing speed, since the configuration of the line memories for image processing and the image processing algorithm are always the same, there are cases where optimal image processing is not performed to degrade the image quality. Moreover, even when it is intended to output a high-quality image, since the configuration of the line memories for image processing and the image processing algorithm are always the same, the image quality cannot be increased to the desired one.

OBJECTS AND SUMMARY

An object of the present invention is to provide an image processing apparatus in which the configurations of the line memories and the circuit associated therewith and the image processing algorithm can be changed in accordance with the image processing condition such as the required image quality, processing speed or output image size.

An image processing apparatus according to a first aspect of the invention is provided with: a pixel matrix formation section having a rewritable circuit configuration, and having a plurality of line memories that output pixel data in parallel; a filtering circuit having a rewritable circuit configuration, and performing filtering of pixel data by use of a pixel matrix based on the pixel data received in parallel from the line memories; a memory for storing setting information for rewriting the configurations of the pixel matrix formation section and the filtering circuit; and a controller for rewriting the configuration of the line memories and the configuration of the filtering circuit by use of the setting information stored in the memory based on an image processing condition.

An image processing apparatus according to a second aspect of the invention is provided with: a processing circuit having a plurality of line memories and performing filtering of pixel data by use of a pixel matrix based on pixel data from the line memories; a memory for storing setting information for rewriting the configuration of the processing circuit; and a controller for rewriting the configuration of the line memories of the processing circuit and the configuration of filtering by use of the setting information stored in the memory based on an image processing condition.

An image processing apparatus according to a third aspect of the invention is provided with: a first circuit comprising a device that has a rewritable configuration, and having a plurality of line memories; a second circuit for processing image data output from the line memories; a memory for storing setting information for rewriting the configuration of the first circuit; and a controller for rewriting the configuration of the line memories of the first circuit by use of the setting information stored in the memory based on an image processing condition.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 7 shows the dot area determination ranges of the modes;

FIG. 8 shows the configuration of a matrix formation section and an isolated point detection section in the processing speed priority mode;

FIG. 10 shows an example of calculation of the dot determination threshold values of the modes.

In the following description, like parts are designated by like reference numbers throughout the several drawings.

DESCRIPTION OF THE PREFERRED EMBODIMENT

Hereinafter, an embodiment of the present invention will be described with reference to the accompanying drawings. In the figures, like reference numbers designate like parts.

Figure 1:
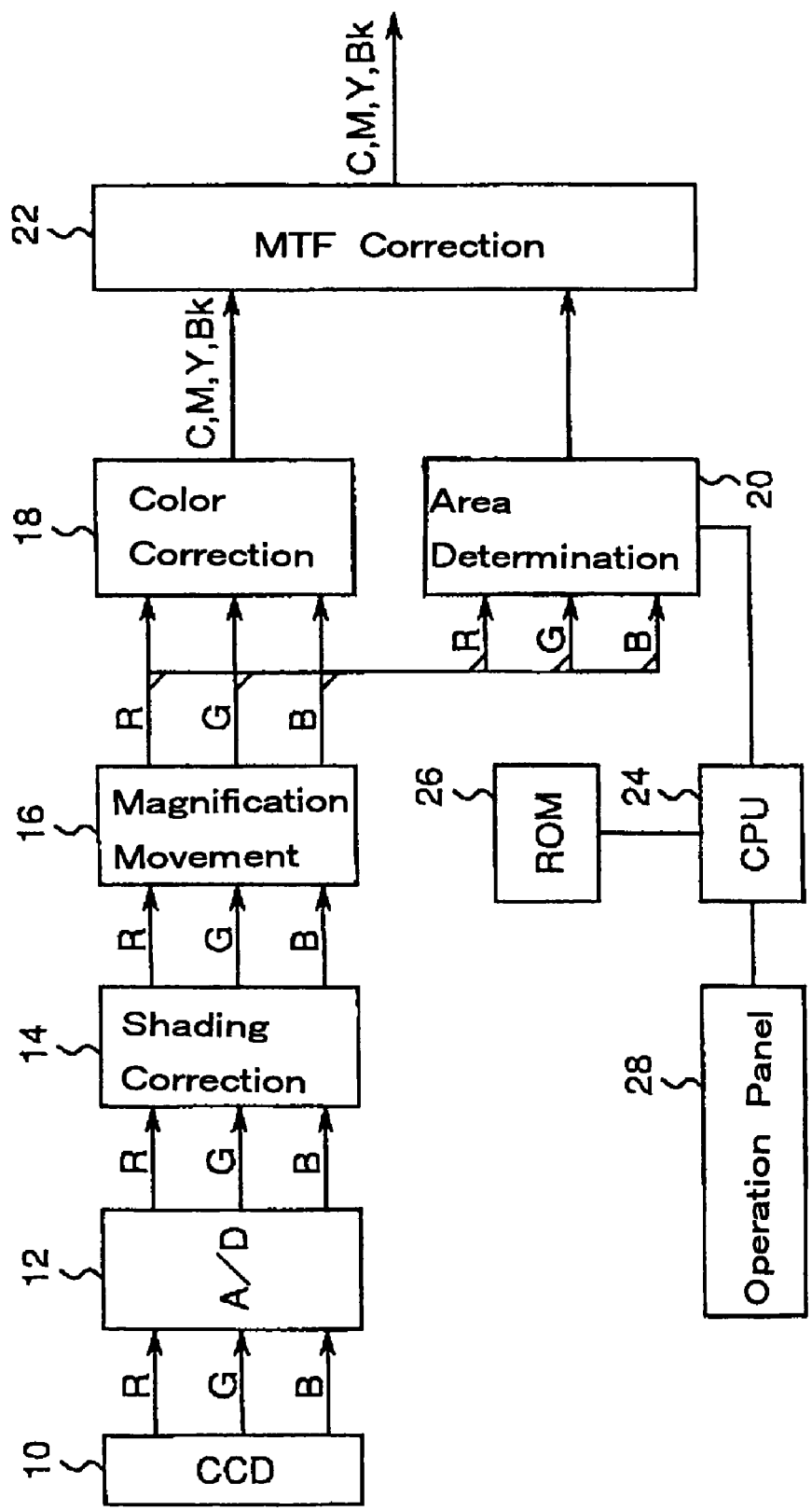
FIG. 1 is a block diagram showing the general configuration of a color image processing circuit.

FIG. 1 shows the general circuit configuration of a color image processing apparatus. The red, green and blue output signals of a color CCD sensor 10 comprising line sensors of three colors are converted into digital signals by an A/D conversion section 12. The obtained red (R), green (G) and blue (B) digital image data are corrected by a shading correction section 14 and supplied to a scaling and movement section 16, where scaling and movement of the image data are performed. The output image data from the scaling and movement section 16 are converted into print colors of cyan (C), magenta (M), yellow (Y) and black (Bk) by a color correction section 18, and determination of areas is performed by an area determination section 20. An MTF correction section 22 corrects the image data output from the color correction section 18 in accordance with the result of the area determination by the area determination section 20, and outputs the corrected image data to a printer. The user can set, with an operation panel 28, the image processing condition such as the output image size (output sheet size), a processing speed priority mode or an image quality priority mode.

In the color image processing circuit, the area determination section 20 comprises a device having a rewritable circuit configuration such as a field programmable gate array (FPGA). The FPGA is an integrated circuit in which the logic circuit is reconstructed based on predetermined setting information. The image processing function is reconstructed by this integrated circuit. The setting information used in the reconstruction of the image processing function is stored in a ROM 26. A CPU 24 reconstructs the image processing function of the area determination section 20 by using the setting information stored in the ROM 26 or a processing circuit program in accordance with the set image processing condition such as the mode or the output size. Consequently, the circuit configuration of the area determination section 20 is rewritten, so that the image processing algorithm is changed. Specifically, in the area determination section 20, a filtering circuit and line memories (for example, FIFO memories) for forming a pixel matrix are formed by using the FPGA, and the configuration of the line memories (the lateral size and the number of lines) and the configuration of the filtering circuit are changed in accordance with the set image processing condition such as the output size or the mode.

Figure 2:
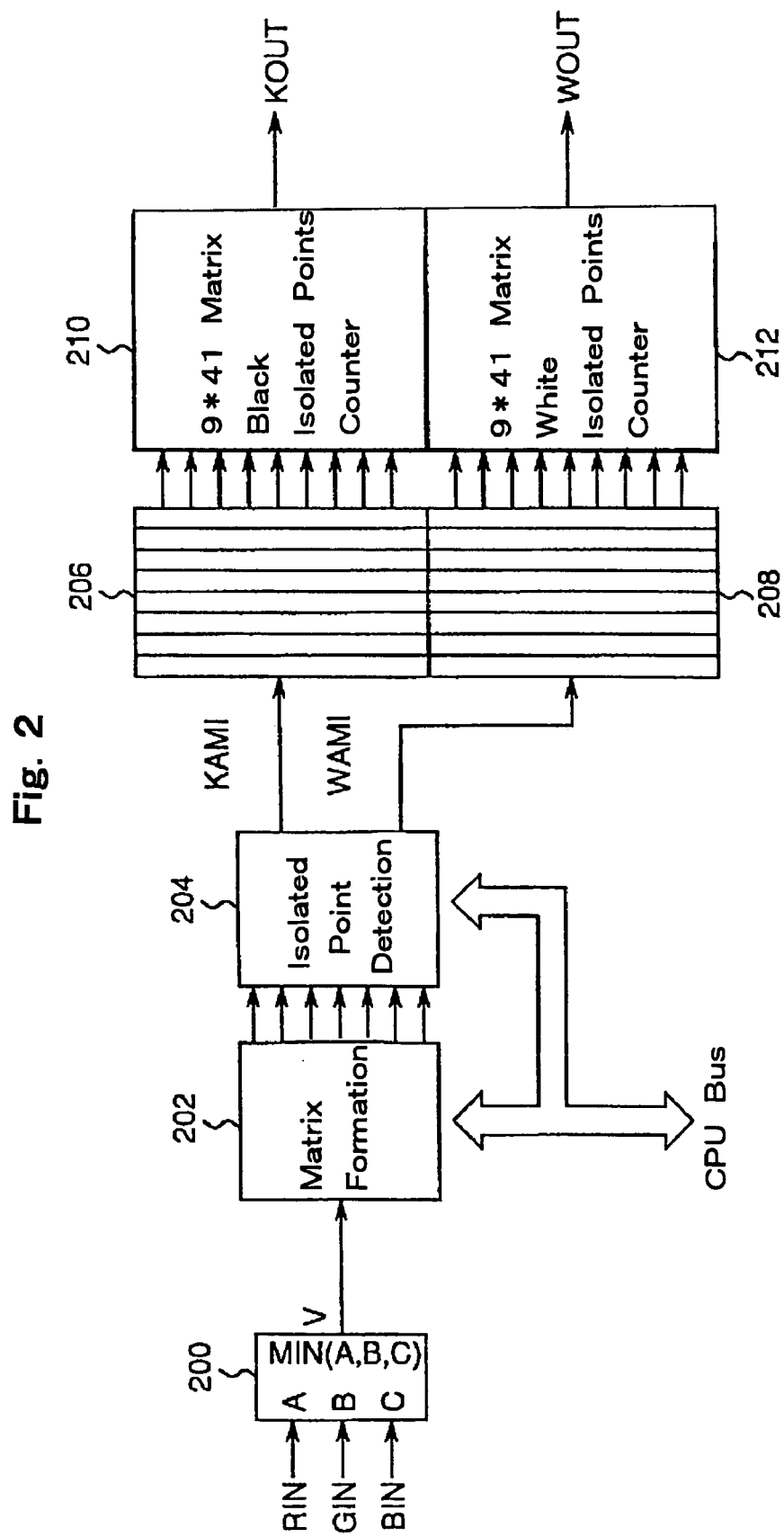
FIG. 2 is a block diagram showing the configuration of a part of an area determination section.
Figure 3:
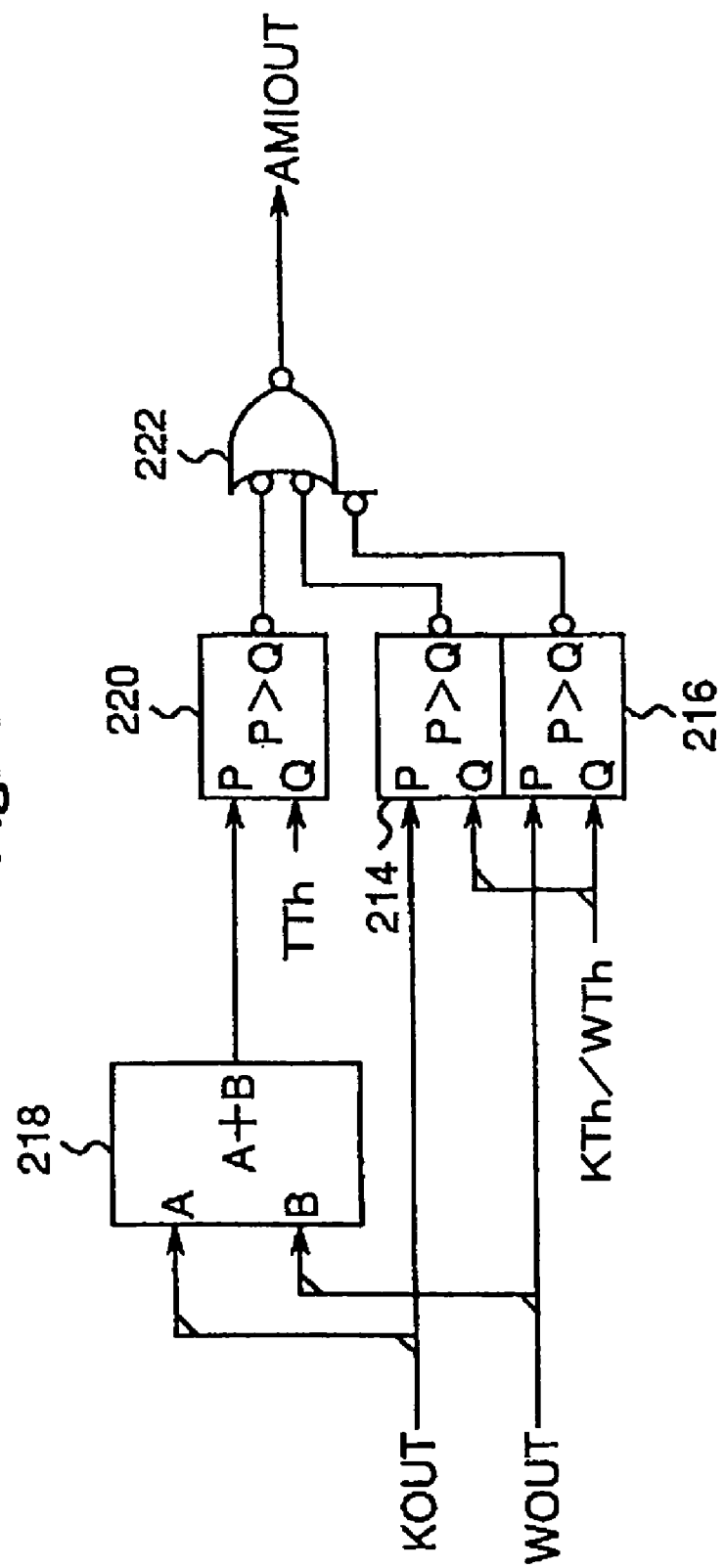
FIG. 3 is a block diagram showing the configuration of another part of the area determination section.

FIGS. 2 and 3 show the configuration of the area determination section 20. For simplicity, only determination of a dot area will be described. First, by an MIN circuit 200, lightness (V) data which is the minimum value of red, green and blue input image data RIN, GIN and BIN is obtained for each pixel from the data RIN, GIN and BIN. Then, at a matrix formation section 202, the lightness data successively input in units of pixels are held in a plurality of cascaded line memories, and the lightness data are parallelly read from the line memories, thereby extracting a pixel matrix. An isolated point detection section 204 detects whether the pixel of interest of the pixel matrix of the lightness (V) data extracted at the matrix formation section is a black or a white isolated point or not based on the pixel matrix, and produces a black isolated point signal KAMI or a white isolated point signal WAMI. The detection as to whether the pixel is an isolated point or not is performed for each pixel. For the pixels detected to be isolated points, the black isolated point signal KAMI or the white isolated point signal WAMI becomes high. For the pixels not detected to be isolated points, the black isolated point signal KAMI or the white isolated point signal WAMI becomes low. The processing algorithms of the matrix formation section 202 and the isolated point detection section 204 are reconstructed by the CPU 24 through a CPU bus based on the setting information stored in the ROM 26. Then, the signals KAMI and the signals WAMI obtained for the pixels are developed into 9×41 matrices 206 and 208, respectively, and the number of black and white isolated points, that is, the number of pixels determined to be isolated points is counted by counter sections 210 and 212 to produce the number of black isolated points KOUT and the number of white isolated points WOUT.

Then, the obtained numbers of isolated points KOUT and WOUT are compared with black and white dot determination threshold values (KTh, WTh) by comparators 214 and 216, respectively. The numbers of isolated points KOUT and WOUT are added by an adder 218, and the sum is compared with a dot determination threshold value (TTh) by a comparator 220. When any of the comparison results is effective (low level), an OR gate 222 determines that the pixels constitute a dot area.

Next, the processing speed priority mode and the image quality priority mode set with the operation panel 28 will be described. When the processing speed priority mode is selected, speed-oriented image processing is performed. When the image quality priority mode is selected, quality-oriented image processing is performed.

Figure 4B:
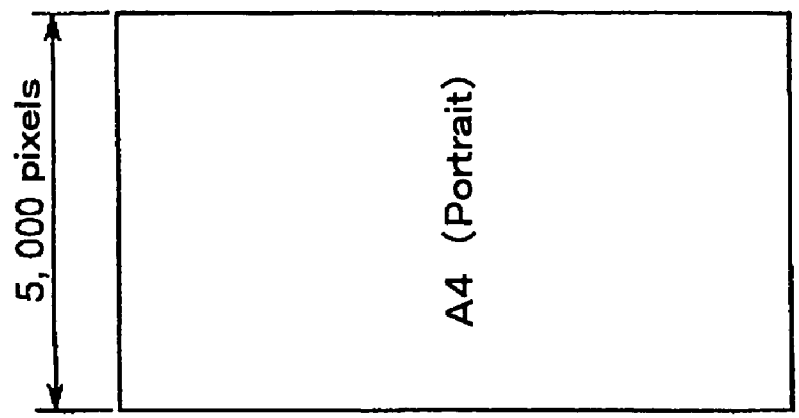
FIG. 4 shows the image reading ranges of a processing speed priority mode and an image quality priority mode.
Figure 4A:
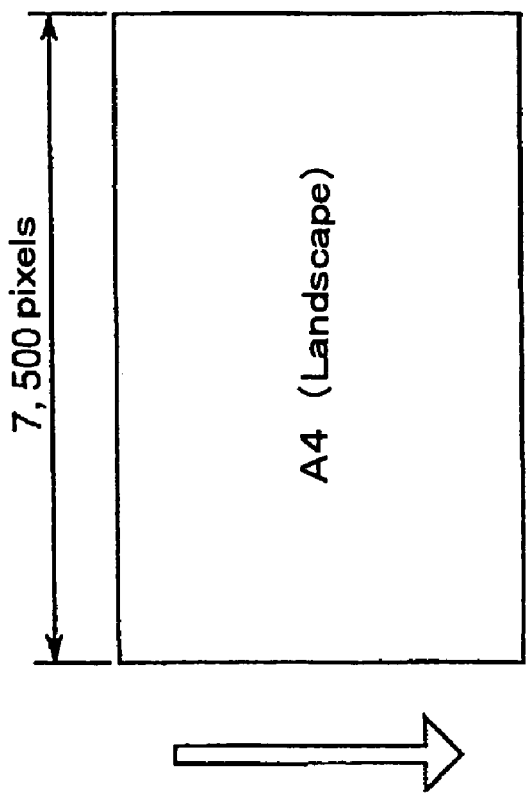

FIG. 4 shows the image reading areas of these modes. In the processing speed priority mode, the original is set in landscape orientation for readout. When the resolution is 600 dpi and the size is A4 in landscape orientation, the data amount is 7,500 pixels per line in the main scanning direction. The scan time is shorter than that of A4 in portrait orientation. In the image quality priority mode, the original is set in portrait orientation for readout. When the resolution is 600 dpi and the size is A4 in portrait orientation, the data amount is 5,000 pixels per line in the main scanning direction. The scan time is longer than that of A4 in landscape orientation. Therefore, the contents of the line memories (FIFO memories) are changed in accordance with the data amount per line. Specifically, in the processing speed priority mode, 8k×8-bit FIFO memories are constructed, and in the image quality priority mode, 5k×8-bit FIFO memories are constructed.

The number of line memories (FIFO memories) is also changed in accordance with the mode. In the image quality priority mode, six FIFO memories are constructed for forming a 7×7-pixel isolated point detection filter. In the processing speed priority mode, four FIFO memories are constructed for forming a 5×5-pixel isolated point detection filter. In the image quality priority mode, the isolated point detection filter is larger than that in the processing speed priority mode, and the time required for its computation is longer than that in the processing speed priority mode. In the image quality mode, since the isolated point detection filter is large, the accuracy of the isolation point detection is higher than that in the processing speed priority mode, so that the quality of the processed image is improved.

As described above, the configuration of the line memories in the matrix formation section 202, that is, the capacity of each line memory and the number of line memories are rewritten according to the mode. When the mode is changed with the operation panel 28, the CPU 24 reconstructs the configuration of the line memories in the matrix formation section 202 by use of the setting information in the ROM 26.

Figure 5A:
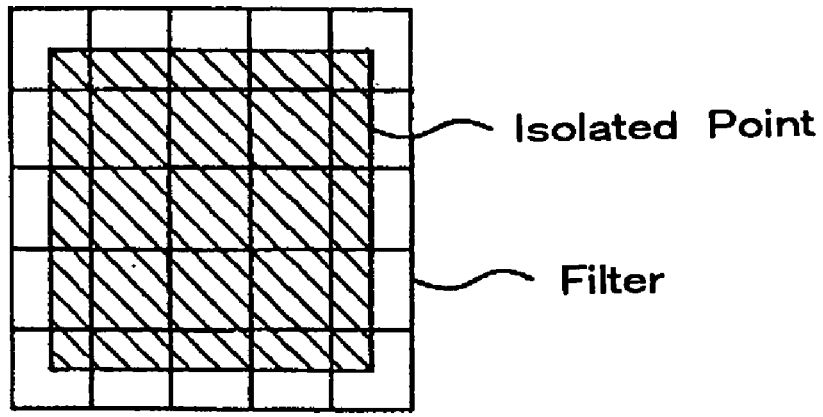
FIG. 5 shows a relationship between the sizes of an isolated point detection filter and isolated points in the processing speed priority mode.
Figure 5B:
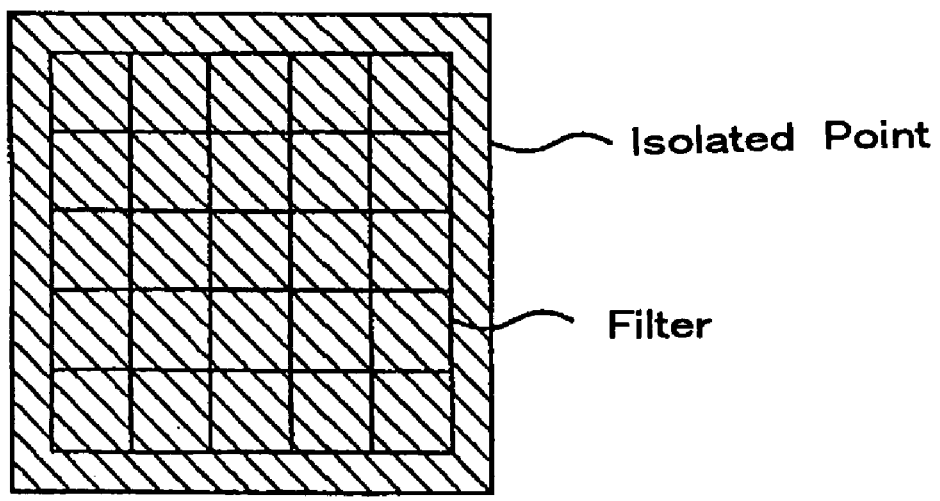
Figure 6A:
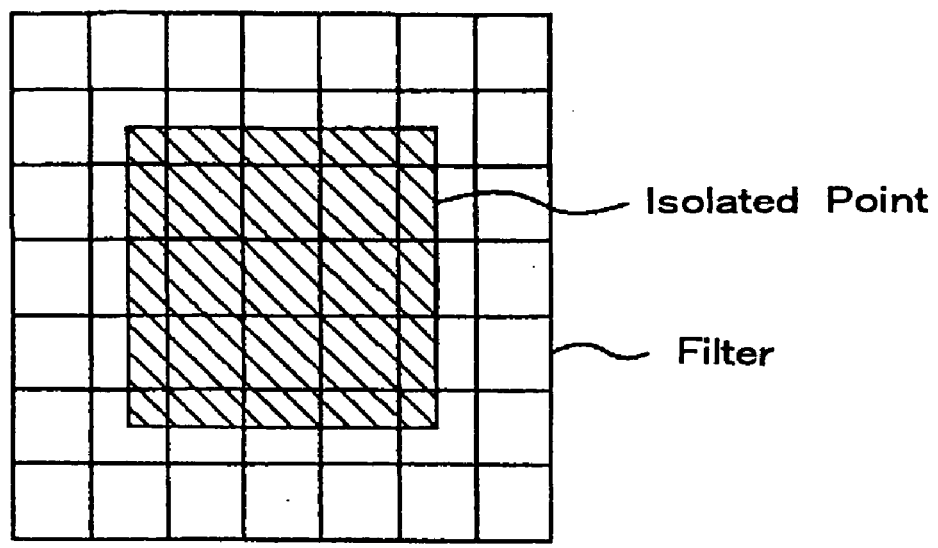
FIG. 6 shows a relationship between the sizes of the isolated point detection filter and the isolated points in the image quality priority mode.
Figure 6B:
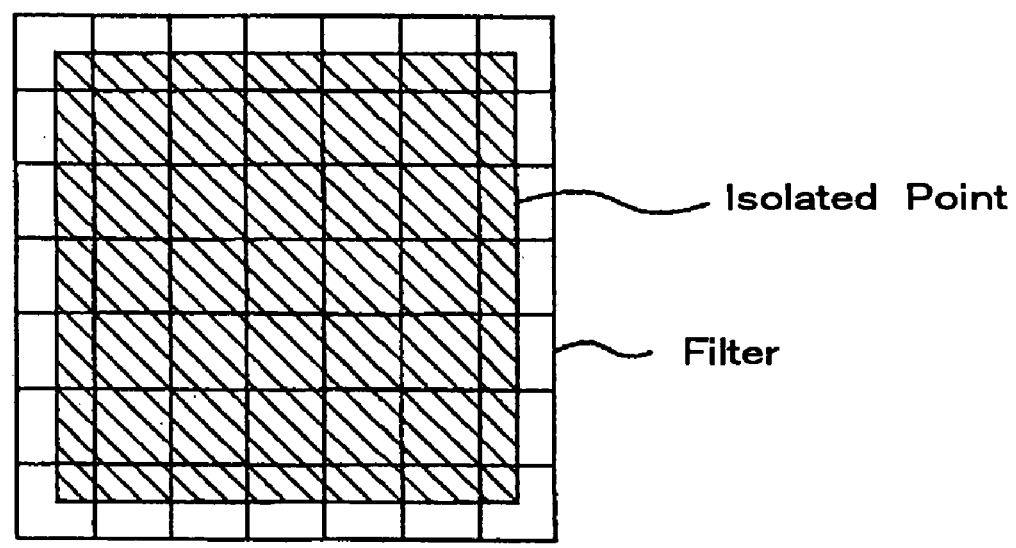

FIGS. 5 and 6 show the relationships between the sizes of the isolated point detection filter and the isolated point (hatched part) in the processing speed priority mode and in the image quality priority mode. In the processing speed priority mode (FIG. 5), since a 5×5-pixel filter is used for a pixel size of 600 dpi, an isolated point forming a dot of 85 L (L is a unit representative of the number of lines per inch, line/inch) is larger than the filter (FIG. 5(b)), so that the isolated point cannot be recognized. Only when forming a dot of not less than 100 L (FIG. 5(a)), an isolated point can be recognized and the dot area can be determined. On the contrary, in the image quality priority mode (FIG. 6), since a 7×7-pixel filter is used for a pixel size of 600 dpi, an isolated point forming a dot of 85 L is not larger than the filter, so that the isolated point can be recognized. Likewise, an isolated point forming a dot of 65 L can be recognized. Thus, all the dot areas can be determined. FIG. 7 shows the dot area determination ranges of the modes. In the processing speed priority mode, the accuracy of the dot area determination is narrow and the dot area cannot be determined at 65L and 85L, so that image quality degradation (moiré pattern, etc.) occurs. In the image quality priority mode, all the dot areas can be determined, so that the image quality is excellent.

The circuit configuration of the area determination section 20 in accordance with the set mode and the output image size (sheet size) is reconstructed by the CPU 24 based on the setting information stored in the ROM 26. Specifically, the configuration of the line memories of the matrix formation section 20 and the circuit configuration of the isolated point detection section are reconstructed in accordance with the output image size and the mode. By thus rewriting the circuit configuration of the matrix formation section 202 and the circuit configuration of the isolated point detection section 204, the image processing accuracy can be changed, so that the image quality can be improved.

FIG. 8 shows the circuit contents of a matrix formation section 202A and an isolated point detection section 204A constructed in the processing speed priority mode. Since the image data is 8-bit data of A4 size in landscape orientation and with a resolution of 600 dpi, FIFO memories of one line require a capacity of 8k×k bits. Moreover, since a 5×5-pixel filter is used, four FIFO memories 2020A are cascaded in the matrix formation section 202A. As pixel data V1 of the first line, the input pixel data is output as it is. Consequently, pixel data V1, V2, V3, V4 and V5 of five lines are output in parallel from the matrix formation section 202A.

The isolated point detection section 204A successively receives the pixel data V1, V2, V3, V4 and V5 in parallel from the matrix formation section 202A, and extracts a 5×5 pixel matrix 2040A. Here, Vi, j ($1 \leq i, j \leq 5$) represents data of a pixel (i, j). Then, for the 5×5 matrix, the condition of peripheral pixels of the pixel of interest situated at the center is examined by filtering sections 2042A and 2044A, and pixels of interest satisfying the conditions of determination of white and black isolated points shown in the figure, that is, white and black isolated points are detected. For the pixels detected to be isolated points, the black isolated point signal KAMI or the white isolated point signal WAMI becomes high. For the pixels not detected to be isolated points, the black isolated point signal KAMI or the white isolated point signal WAMI becomes low.

Figure 9:
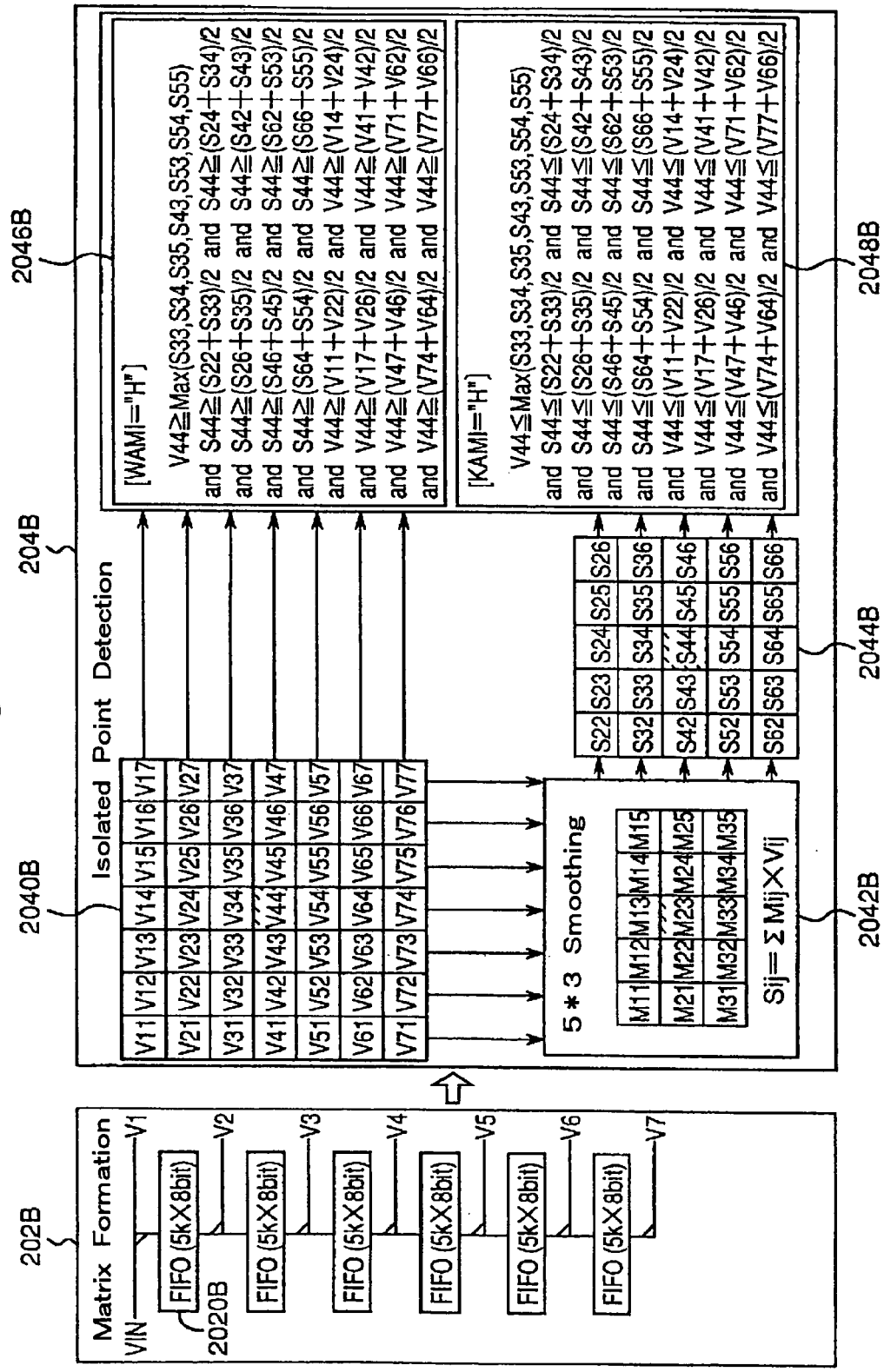
FIG. 9 shows the configuration of the matrix formation section and the isolated point detection section in the image quality priority mode.

FIG. 9 shows the contents of a matrix formation section 202B and an isolated point detection section 204B constructed in the image quality priority mode. Since the image data of interest in this mode is 8-bit data of A4 in portrait orientation and with a resolution of 600 dpi, FIFO memories of one line require a capacity of 5k×8 bits. Moreover, six FIFO memories 2020B are cascaded for forming a 7×7-pixel isolated point detection filter. As pixel data V1 of the first line, the input pixel data is output as it is. Consequently, pixel data V1, V2, V3, V4, V5, V6 and V7 of seven lines are output in parallel from the matrix formation section 202B.

The isolated point detection section 204B successively receives the pixel data V1, V2, V3, V4, V5, V6 and V7 in parallel from the matrix formation section 202B, and extracts a 7×7 pixel matrix 2040B. Here, Vi, j ($1 \leq i, j \leq 7$) represents data of a pixel (i, j). Then, after the 7×7 pixel matrix 2040B is smoothed by use of a 5×3-pixel smoothing filter 2042B, a 5×5 pixel matrix 2044B is extracted from the smoothed data Si, j. In the case of a white isolated point, the condition of peripheral pixels of the pixel of interest is examined by use of the pixel matrices 2040B and 2044B, and the white isolated point that satisfies the condition of the white isolated point (WAMI="H") shown in the figure is obtained by a filtering section 2046B. In the case of a black isolated point, the condition of peripheral pixels of the pixel of interest is examined by a filtering section 2048B by use of the pixel matrices 2040B and 2044B based on the condition shown in the figure, and the black isolated point that satisfies the condition of the black isolated point (KAMI="H") shown in the figure is obtained. For the pixels detected to be isolated points, the black isolated point signal KAMI or the white isolated point signal WAMI becomes high. For the pixels not detected to be isolated points, the black isolated point signal KAMI or the white isolated point signal WAMI becomes low.

Moreover, the area determination section 20 is rewritten in accordance with the output image size (output sheet size) set with the operation panel 28. For example, when A4 in landscape orientation is set as the output image size, the circuit configuration shown in FIG. 8 is constructed, and when A4 in portrait orientation is set as the output image size, the circuit configuration shown in FIG. 9 is constructed. Description of the contents of FIGS. 8 and 9 is omitted as it has already been given.

FIG. 10 shows an example of calculation of the dot determination threshold values of the modes. In the image quality priority mode, in theory, there are 22 isolated points detected by the isolated point detection section by use of the 7×7 pixel matrix in a 9×41 pixel matrix. Therefore, the threshold value for the image quality priority mode is 22.

With the above-described embodiment, the circuit configuration associated with filtering in the image processing circuit can be reconstructed in accordance with the image processing condition required by the user. Consequently, the image processing algorithm can be changed in accordance with various image processing conditions, so that the quality of the output image can be improved.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing apparatus comprising:
    a pixel matrix formation section having a rewritable circuit configuration, and having a plurality of line memories that form a pixel matrix based on pixel data and output the pixel data in parallel;
    a filtering circuit having a rewritable circuit configuration, and performing filtering of pixel data by use of the pixel matrix based on the pixel data received in parallel from the line memories;
    a memory for storing setting information for rewriting the circuit configurations of the pixel matrix formation section and the filtering circuit; and
    a controller for rewriting a configuration of the line memories and the circuit configuration of the filtering circuit by use of the setting information stored in the memory based on an image processing condition.

2. An image processing apparatus as claimed in claim 1, wherein said image processing condition is an output image size.

3. An image processing apparatus as claimed in claim 1, wherein said image processing condition is a processing speed.

4. An image processing apparatus as claimed in claim 1, further comprising:
an operation panel for setting the image processing condition.

5. An image processing apparatus as claimed in claim 4, wherein said controller rewrites the circuit configuration in accordance with an operation mode set with the operation panel.

6. An image processing apparatus as claimed in claim 1, wherein said filtering circuit is used for image area determination.

7. An image processing apparatus as claimed in claim 6, wherein the filtering circuit performs filtering for detecting an isolated point of an image.

8. An image processing apparatus as claimed in claim 1, wherein the image processing condition is selectable from multiple values for a given output device.

9. An image processing apparatus comprising:
a processing circuit having a plurality of line memories that form a pixel matrix based on pixel data and performing filtering of the pixel data by use of the pixel matrix from the line memories;
a memory for storing setting information for rewriting a configuration of the processing circuit; and
a controller for rewriting a configuration of the line memories of the processing circuit and the configuration of filtering by use of the setting information stored in the memory based on an image processing condition.

10. An image processing apparatus as claimed in claim 9, wherein said image processing condition is an output image size.

11. An image processing apparatus as claimed in claim 9, wherein said image processing condition is a processing speed.

12. An image processing apparatus as claimed in claim 9, further comprising:
an operation panel for setting the image processing condition.

13. An image processing apparatus as claimed in claim 12, wherein said controller rewrites the configuration of the processing circuit in accordance with an operation mode set with the operation panel.

14. An image processing apparatus as claimed in claim 9, wherein said processing circuit is used for image area determination.

15. An image processing apparatus as claimed in claim 14, wherein the processing circuit performs filtering for detecting an isolated point of an image.

16. An image processing apparatus as claimed in claim 9, wherein the image processing condition is selectable from multiple values for a given output device.

* * * * *